(12) United States Patent
Jung et al.

(10) Patent No.: US 8,384,681 B2
(45) Date of Patent: Feb. 26, 2013

(54) TOUCH SCREEN PANEL AND METHOD OF FABRICATING THE SAME

(75) Inventors: Tae-Hyeog Jung, Yongin (KR); Jin-Guen Kim, Yongin (KR); Sung-Ku Kang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 615 days.

(21) Appl. No.: 12/618,703

(22) Filed: Nov. 13, 2009

(65) Prior Publication Data

US 2010/0182258 A1 Jul. 22, 2010

(30) Foreign Application Priority Data

Jan. 16, 2009 (KR) .................. 10-2009-0003633

(51) Int. Cl.
*G06F 3/041* (2006.01)
(52) U.S. Cl. .................. 345/173; 178/18.06
(58) Field of Classification Search .................. 345/173, 345/174; 178/18.05, 18.06, 18.07, 19.03
See application file for complete search history.

(56) References Cited

U.S. PATENT DOCUMENTS

| | | | | |
|---|---|---|---|---|
| 2008/0309633 A1* | 12/2008 | Hotelling et al. | ............. | 345/173 |
| 2008/0309635 A1* | 12/2008 | Matsuo | ............. | 345/173 |
| 2009/0096754 A1* | 4/2009 | Hinata | ............. | 345/173 |
| 2010/0108409 A1* | 5/2010 | Tanaka et al. | ............. | 178/18.06 |

FOREIGN PATENT DOCUMENTS

| | | |
|---|---|---|
| KR | 10-2005-0072680 A | 7/2005 |
| KR | 10-2007-0017296 | 2/2007 |
| KR | 10-2008-0019125 | 3/2008 |
| KR | 10-2008-0096976 A | 11/2008 |
| KR | 10-2008-0110477 A | 12/2008 |

OTHER PUBLICATIONS

KIPO Office action dated Oct. 27, 2010 in priority Korean application No. 10-2009-0003633.
KIPO Office action dated Jun. 25, 2011, for Korean priority Patent application 10-2009-0003633, 1 page.

* cited by examiner

*Primary Examiner* — Adam R Giesy
(74) *Attorney, Agent, or Firm* — Christie, Parker & Hale, LLP

(57) ABSTRACT

A touch screen panel provided in an image display device. The touch screen panel includes a transparent substrate, a plurality of first sensing patterns on a first side of the transparent substrate and coupled to each other along a first direction, a first insulating film on the first sensing patterns, and a plurality of second sensing patterns on the first insulating film and coupled to each other along a second direction crossing the first direction. The second sensing patterns are alternately arranged with the first sensing patterns to not overlap with the first sensing patterns, wherein the thickness of the first sensing patterns is different from that of the second sensing patterns.

10 Claims, 5 Drawing Sheets

FIG. 6

| Thickness of transparent ground electrode | Thickness of X and Y sensing patterns | X reflectance value | Y reflectance value | X reflectance | Y reflectance | Differnece in reflectance | Prediction value when window is provided |
|---|---|---|---|---|---|---|---|
| 180Å | 180Å | 15.9 | 18.5 | 7.950% | 9.250 | 16.352% | 2.8% |
| | 220Å | 16.9 | 20.1 | 8.450% | 10.050% | 18.935% | 3.2% |
| 200Å | 180Å | 16.2 | 18.8 | 8.100% | 9.400% | 16.049% | 2.7% |
| | 220Å | 17.6 | 20.4 | 8.800% | 10.200% | 15.909% | 2.7% |
| 220Å | X=180Å Y=180Å | 16.9 | 19.2 | 8.450% | 9.600% | 13.609% | 2.3% |
| 220Å | X=220Å Y=220Å | 18.3 | 20.8 | 9.150% | 10.400% | 13.661% | 2.3% |
| 220Å | X=220Å Y=180Å | 18.3 | 19.2 | 9.150% | 9.600% | 4.918% | 0.8% |

TOUCH SCREEN PANEL AND METHOD OF FABRICATING THE SAME

CROSS-REFERENCE TO RELATED APPLICATIONS

This application claims priority to and the benefit of Korean Patent Application No. 10-2009-0003633, filed on Jan. 16, 2009, in the Korean Intellectual Property Office, the entire content of which is incorporated herein by reference.

BACKGROUND OF THE INVENTION

1. Field of the Invention

The present invention relates to a touch screen panel provided in an image display device, etc., and a method of fabricating the same.

2. Description of Related Art

A touch screen panel is an input device by which a user can input his or her instruction by selecting an instructed content displayed on a screen such as an image display device, etc. using a human's finger or an object.

To this end, the touch screen panel is provided on the front face of the image display device to convert a contact position with the human's finger or object into an electrical signal. Therefore, the instructed content selected on the contact position is accepted as an input signal.

Applications of the touch screen panel as described above are expanding widely because it can replace an input device that is coupled to and operates the image display device such as a keyboard, a mouse, or the like.

A touch screen panel can be categorized into a resistive type, a photosensitive type or an electrostatic capacitive type.

Among the types of touch screen panels, the electrostatic capacitive type touch screen panel utilizes a conductive sensing pattern to sense a change in electrostatic capacitance formed in association with other sensing patterns in the vicinity thereof or a ground electrode, etc., thereby converting a touch with a contact position into an electrical signal.

Here, in order to determine the contact position on the contact surface, the sensing pattern includes first sensing patterns (X patterns) formed to be coupled along a first direction, and second sensing patterns (Y patterns) formed to be coupled along a second direction.

The first and second sensing patterns as described above are generally positioned in the same layer. In this case, the sensing patterns positioned in the same X or Y lines are coupled by forming separate coupling patterns through contact holes formed in insulating films thereon. Accordingly, additional masks may be required and the fabrication process thereof may be complicated.

In addition, the touch screen panel is positioned on the display panel such as a liquid crystal display panel, etc., and an external light incident on the touch screen panel is reflected by the touch screen panel. Therefore, in order to display a uniform image, it is desirable to reduce the difference in light reflectance over the entire touch screen panel.

SUMMARY OF THE INVENTION

Aspects of embodiments of the present invention are directed toward a touch screen panel that has a reduced difference in light reflectance, and a simplified fabrication process with reduced number of masks, and a method of fabricating the same.

According to an embodiment of the present invention, there is provided a touch screen panel including: a transparent substrate; a plurality of first sensing patterns on a first surface of the transparent substrate and coupled to each other along a first direction; a first insulating film on the first sensing patterns; and a plurality of second sensing patterns on the first insulating film and coupled to each other along a second direction crossing the first direction, the second sensing patterns being alternately arranged with the first sensing patterns to not overlap with the first sensing patterns, wherein the thickness of the first sensing patterns is different from that of the second sensing patterns. Here, the thickness of the first sensing patterns may be greater than that of the second sensing patterns.

According to an embodiment of the present invention, there is provided a method of fabricating a touch screen panel including: forming a plurality of first sensing patterns coupled to each other along a first direction on a first surface of a transparent substrate; forming a first insulating film on the first sensing patterns; and forming a plurality of second sensing patterns coupled to each other along a second direction crossing the first direction, the second sensing patterns being disposed alternately with the first sensing patterns to not overlap with the first sensing patterns on the first insulating film, wherein the thickness of the first sensing patterns is different from that of the second sensing patterns.

In the touch screen panel as described in the above exemplary embodiments, the first sensing patterns coupled to each other along the first direction and the second sensing patterns coupled to each other along the second direction are disposed in different layers, making it feasible to reduce the number of masks used in a fabrication process and to simplify the process.

Also, the thickness of the first sensing patterns is set to be different from that of the second sensing patterns, making it feasible to reduce a difference in light reflectance between the sensing patterns that may be generated as they are disposed in different layers.

BRIEF DESCRIPTION OF THE DRAWINGS

The accompanying drawings, together with the specification, illustrate exemplary embodiments of the present invention, and, together with the description, serve to explain the principles of the present invention.

FIG. 6 is a table showing reflectance measured according to the thickness of the first and second sensing patterns and a transparent ground electrode of FIG. 4.

DETAILED DESCRIPTION OF EXEMPLARY EMBODIMENTS

Figure 1:
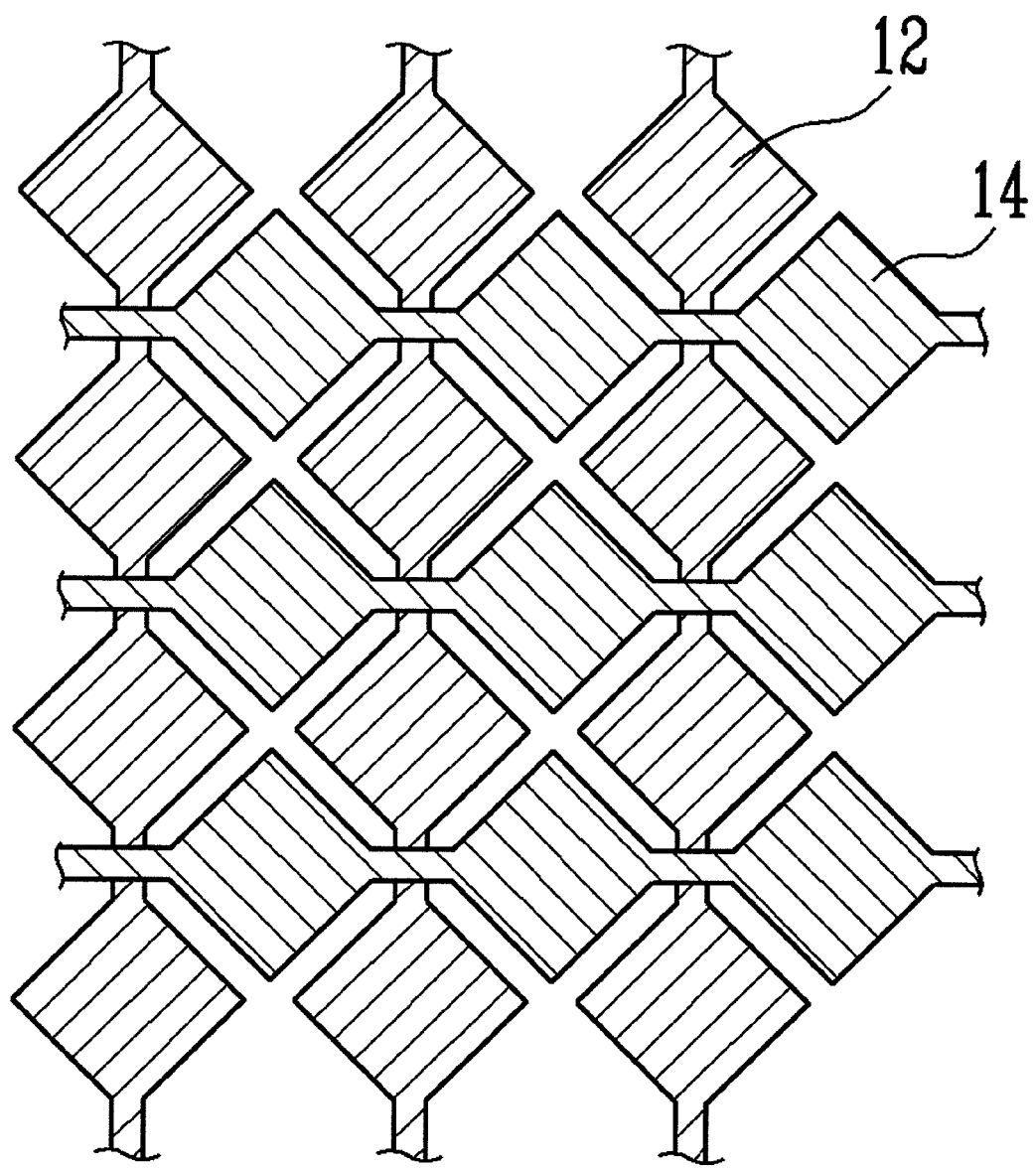
FIG. 1 is a plan schematic view showing the arrangement of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, exemplary embodiments according to the present invention will be described in more detail with reference to the accompanying drawings.

FIG. 1 is a plan schematic view showing the arrangement of sensing patterns according to an embodiment of the present invention.

Referring to FIG. 1, the sensing patterns according to the embodiment of the present invention include first and second sensing patterns 12 and 14 that are alternately disposed, wherein sensing patterns having the same X-coordinate are coupled to each other by a column unit or sensing patterns having the same Y-coordinate are coupled to each other by a row unit.

For example, the first sensing patterns 12 may include a plurality of X patterns, wherein sensing patterns having the same X-coordinate along a first direction (a column direction) in one column are coupled to each other. The second sensing patterns 14 may include a plurality of Y patterns, wherein sensing patterns having the same Y-coordinate along a second direction (a row direction) in one row are coupled to each other.

However, in the embodiment of FIG. 1, the first sensing patterns 12 and the second sensing patterns 14 are disposed in different layers, respectively. For example, the first sensing patterns 12 may be positioned in a lower layer, and the second sensing patterns 14 may be positioned in an upper layer. Insulating films may be interposed therebetween.

As described above, if the first sensing patterns 12 and the second sensing patterns 14 are disposed in different layers, the first sensing patterns 12 positioned on the same column can be formed to be coupled to each other while patterning the first sensing patterns 12, and the second sensing patterns 14 positioned in the same row can be formed to be coupled to each other while patterning the second sensing patterns 14.

Therefore, a process of forming separate contact holes and coupling patterns for coupling adjacent sensing patterns can be omitted, thereby making it feasible to reduce the number of masks and to simplify the fabrication process.

Figure 2:
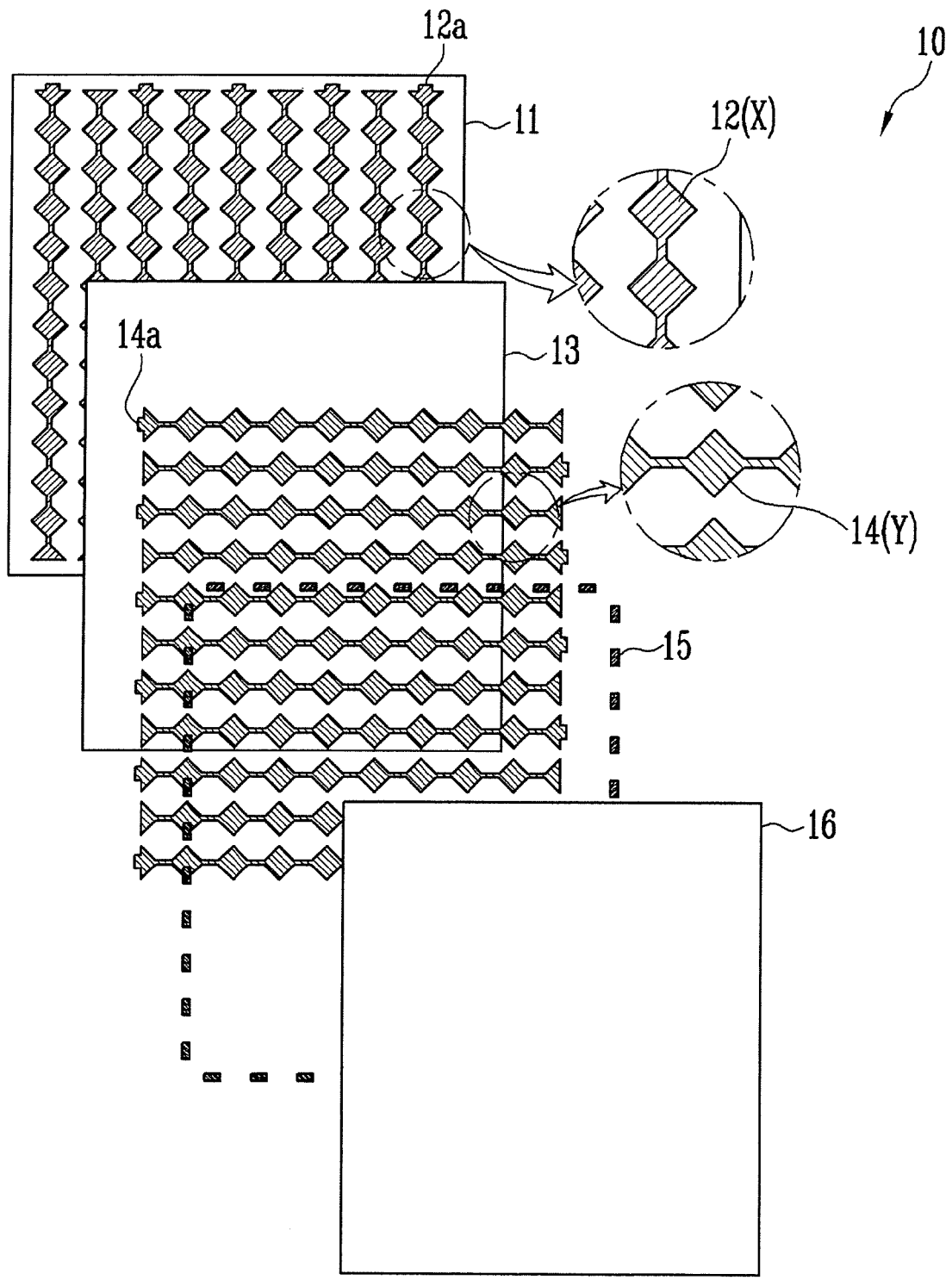
FIG. 2 is an exploded plan schematic view of a touch screen panel according an embodiment of the present invention.
Figure 3:
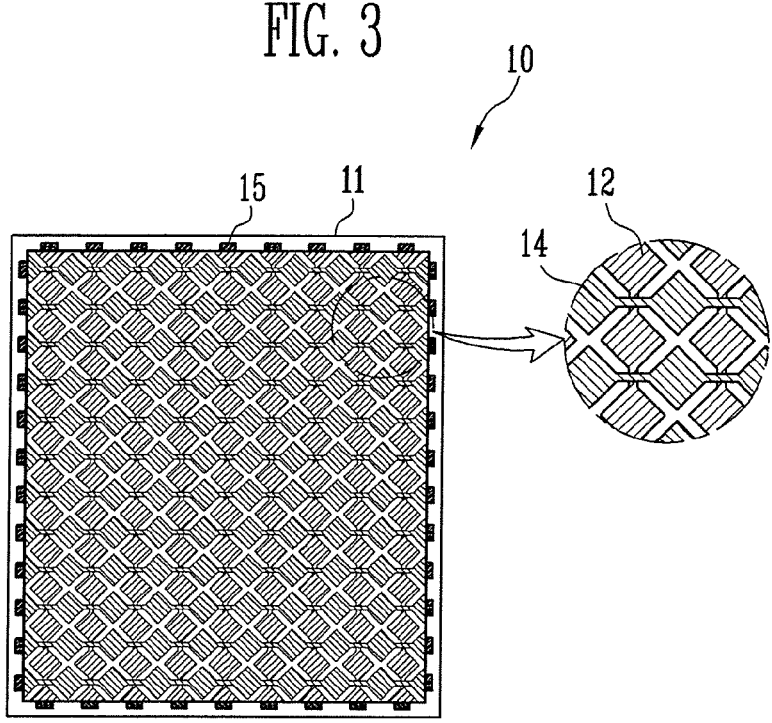
FIG. 3 is a plan schematic view of the assembled touch screen panel of FIG. 2.

FIG. 2 is an exploded plan schematic view of a touch screen panel according an embodiment of the present invention, and FIG. 3 is a plan schematic view of the assembled touch screen panel of FIG. 2.

Referring to FIGS. 2 and 3, the touch screen panel 10 according to the embodiment of the present invention includes a transparent substrate 11. In addition, the touch screen panel 10 includes first sensing patterns 12, a first insulating film 13, second sensing patterns 14, metal patterns 15 and a second insulating film 16 that are formed sequentially on the transparent substrate 11.

The first sensing patterns 12 are formed on one surface of the transparent substrate 11 to be coupled to each other along a first direction. For example, the first sensing patterns 12 may include a plurality of X patterns, wherein first sensing patterns 12 having the same X-coordinate are coupled to each other in one column. The first sensing patterns 12 as described above may be formed on the transparent substrate 11 to be close to each other, having regular patterns such as diamond patterns. However, the shape of the first sensing patterns 12 is not limited to the diamond shape patterns, but it may be implemented as other suitable shapes such that the sensing patterns can be close to each other.

The first sensing patterns 12 have pads 12a to be electrically coupled to the metal patterns 15 for each column unit of the first sensing patterns 12. The pads 12a of the first sensing patterns 12 may be alternately provided on the upper side or the lower side, may be positioned on any one of the upper side or the lower side, or may be positioned on both the upper and lower sides, in each of the column unit.

However, the first sensing patterns 12 are formed not to overlap with the second sensing patterns 14, except for the crossing coupling portions thereof. In other words, the first sensing patterns 12 and the second sensing patterns 14 are disposed alternately to cross each other.

The first insulating film 13 is formed on the first sensing patterns 12 to cover them.

The second sensing patterns 14 are formed on the first insulating film 13 to be coupled to each other along a second direction, but are disposed alternately with the first sensing patterns 12 so as not to overlap with the first sensing patterns 12. For example, the second sensing patterns 14 may be formed to be close to each other, having the same diamond patterns as the first sensing patterns 12, and may include a plurality of Y patterns, wherein second sensing patterns 14 having the same Y-coordinate are coupled to each other in one row.

The second sensing patterns 14 have pads 14a that are electrically coupled to the metal patterns 15 in each row of the second sensing patterns 14. The pads 14a of the second sensing patterns 14 may be alternately provided on the left side or the right side, may be positioned on any one of the left side or the right side, or may be positioned on both the left and right sides, for each row of the second sensing patterns 14.

In addition, the first and second sensing patterns 12 and 14 and the first insulating film 13 are composed of a transparent material so that light emitted from a display panel, etc. disposed below the lower portion of the touch screen panel 10 can transmit through the touch screen panel 10. In one embodiment, the first and second sensing patterns 12 and 14 are composed of a transparent electrode material such as indium tin oxide (hereinafter, referred to as ITO), and the first insulating film 13 is composed of a transparent insulating material.

The thicknesses of the sensing patterns and the insulation film can be set in a suitable range such that the touch screen panel 10 (e.g., the first and second sensing patterns 12 and 14) can have a relatively low surface resistance and providing sufficient transmittance of light from the display panel. In other words, the thicknesses of the first and second sensing patterns 12 and 14 and the first insulating film 13 can be suitably modified in consideration of the desired transmittance and the surface resistance.

For example, the first and second sensing patterns 12 and 14 may be formed in an indium tin oxide (hereinafter, referred to as ITO) pattern having a thickness between 100 and 300 Å, and the first insulating film 13 may be composed of a transparent insulating material having a thickness between 400 and 1000 Å (e.g., a thickness between 400 and 700 Å) in which an optical refractive index in the range of 1.6 to 1.9 (based on 550 nm wavelength) is provided. However, the present invention is not limited to the above described embodiment. Therefore, the thicknesses of the first and second sensing patterns 12 and 14 and the first insulating film 13 may also be suitably changed in consideration of the desired transmittance and/or the surface resistance, etc.

However, in the embodiment of the present invention, the thicknesses of the first sensing patterns 12 and the second sensing patterns 14 are set to be different so that the difference in light reflectance that may be generated as they are positioned in different layers can be reduced. In one embodiment, the thickness of the first sensing patterns 12 may be set to be greater than that of the second sensing patterns 14 positioned on the upper portion. The detailed description thereof will be described later.

The metal patterns 15 are disposed on edge portions of the regions where the first and second sensing patterns 12 and 14 are formed, e.g., on regions corresponding to the pads 12a and 14a of the first and second sensing patterns 12 and 14. The metal patterns 15 as described above electrically couple the sensing patterns 12 and 14 in column units and/or in row units to position detecting lines, respectively, to allow contact position detecting signals to be supplied to a driving circuit, etc. Here, the metal patterns 15 may be integrated with the position detecting lines.

The second insulating film 16 is formed on the second sensing patterns 14 to cover them. In one embodiment, the second insulating film 16 may be formed on the second sensing patterns 14, composed of a transparent insulating material having a thickness between 400 and 1000 Å. The second insulating film 16 as described above may be omitted according to the design of a product.

If the assembled touch screen panel 10 as shown in FIG. 3 is touched by a human's finger or an object, a change in electrostatic capacitance in accordance with the contact position is transferred to the driving circuit, via the first and second sensing patterns 12 and 14, the metal patterns 15 and the position detecting lines. The change in electrostatic capacitance is converted into an electrical signal, for example, by the X and Y input processing circuits, etc. so that the contact position is determined.

With the touch screen panel 10 as described in above embodiments, the first sensing patterns 12 coupled to each other along the first direction and the second sensing patterns 14 coupled to each other along the second direction are disposed in different layers, thereby making it feasible to reduce the number of masks used in its fabrication process and to simplify the process.

Also, the thicknesses of the first sensing patterns 12 and the second sensing patterns 14 are set to be different, making it feasible to improve differences in light transmittance of the sensing patterns 12 and 14 that may be generated as they are positioned in different layers.

Figure 4:
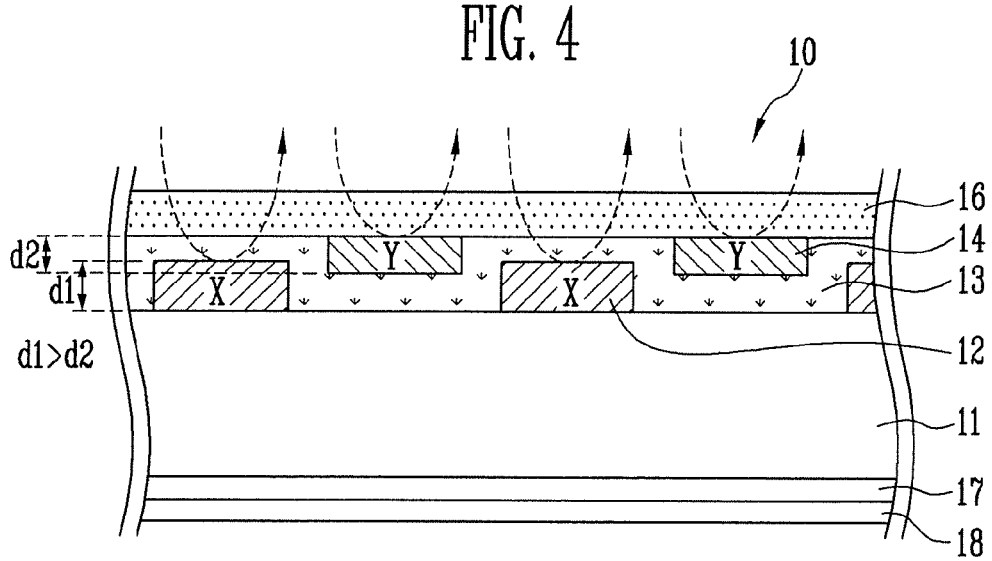
FIG. 4 is a cross-sectional schematic view of certain parts of the assembled touch screen panel of FIG. 2.

FIG. 4 is a cross-sectional schematic view of certain parts of the assembled touch screen panel of FIG. 2. When describing FIG. 4, the same reference numerals are given to the same elements as shown in FIGS. 2 and 3, and the detailed description thereof will be omitted.

Referring to FIG. 4, the first sensing patterns 12 and the second sensing patterns 14 are interposed between the first insulating film 13 and are disposed alternately in different layers.

If the first and second sensing patterns 12 and 14 are disposed in different layers as described above, the first or second sensing patterns 12 or 14 positioned in the same row or in the same column can be formed as coupled during a patterning step. Accordingly, a process of forming contact holes for coupling the first or second sensing patterns 12 or 14 positioned in the same row or in the same column, etc., may be omitted.

However, when the first and second sensing patterns 12 and 14 are positioned in different layers, light paths of external light incident on the first and second sensing patterns 12 and 14 become different so that the reflectances of the external light reflected by the first sensing patterns 12 and the second sensing patterns 14 may be different.

In other words, when the touch screen panel 10 is positioned on the display panel, the difference in light reflectance between the first sensing patterns 12 and the second sensing patterns 14 as described above may deteriorate the uniformity of an image displayed by the display panel.

Therefore, in an embodiment of the present invention, the thickness d1 of the first sensing patterns 12 and the thickness d2 of the second sensing patterns 14 are suitably set to be different. In one embodiment, the thickness d1 of the first sensing patterns 12 is set to be greater than the thickness d2 of the second sensing patterns 14. Thereby, the difference in light reflectance between the first sensing patterns 12 and the second sensing patterns 14 is reduced to allow the uniform image to be displayed.

In addition, a transparent ground electrode 17 and a third insulating film 18 that covers the transparent ground electrode 17 may further be formed on the other surface opposite to the surface of the transparent substrate 11 on which the first and second sensing patterns 12 and 14 are formed, that is, on the lower surface of the transparent substrate 11.

For example, the transparent ground electrode 17 composed of a transparent electrode material such as ITO, etc. having a thickness between 100 and 300 Å may be formed on the lower surface of the transparent substrate 11, and the third insulating film 18 that covers the transparent ground electrode 17, having a thickness between 400 and 1000 Å, may be formed on the lower surface of the transparent ground electrode 17.

However, the foregoing is merely one embodiment, but the thicknesses of the transparent ground electrode 17 and the third insulating film 18 may be suitably modified in consideration of the desired light transmittance, etc. Also, the transparent ground electrode 17 and/or the third insulating film 18 may also be omitted according to the design of a product.

The transparent ground electrode 17 may be used in securing stability between the touch screen panel 10 and the display panel, etc. Also, the transparent ground electrode 17 may be used in forming suitable electrostatic capacitances with the first and second sensing patterns 12 and 14 according to the design method of the touch screen panel 10.

In other words, in the electrostatic capacitive type touch screen panel 10, in order to sense the contact position, the electrostatic capacitance between the first sensing patterns 12 and the second sensing patterns 14 may be used, or the electrostatic capacitance between the first and second sensing patterns 12 and 14 and the transparent ground electrode 17 may be used, wherein this may be suitably modified.

FIGS. 5A to 5E are cross-sectional schematic views sequentially showing a method of fabricating the touch screen panel of FIG. 4.

Figure 5A:
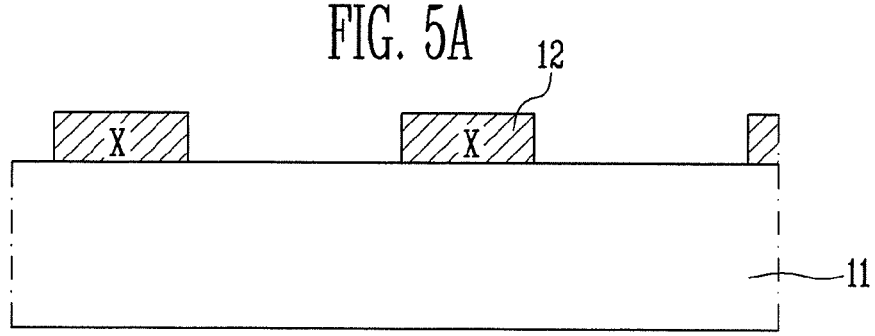
FIGS. 5A, 5B, 5C, 5D and 5E are cross-sectional schematic views sequentially showing a method of fabricating the touch screen panel of FIG. 4.

First, referring to FIG. 5A, a transparent electrode material such as ITO is deposited on a transparent substrate 11 and then is patterned, thereby forming first sensing patterns 12. Here, although coupling parts of the first sensing patterns 12 are not shown, the first sensing patterns 12 are patterned in order to be coupled to each other in a first direction (for example, in a column direction).

Figure 5B:
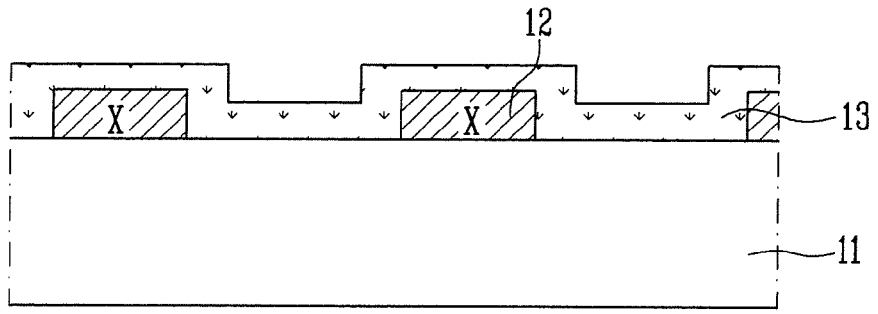

Thereafter, as shown in FIG. 5B, a first insulating material is printed and fired (or cured) on the first sensing patterns 12 by utilizing a suitable printing method whose process is relatively simple, thereby forming a first insulating film 13. In addition, the feature that the first insulating film 13 is formed by utilizing the suitable printing method is merely one embodiment for carrying out the present invention so that the present invention is not limited thereto. For example, the first insulating film 13 may be formed by utilizing a chemical vapor deposition (CVD) method and/or a sputtering method.

Figure 5C:
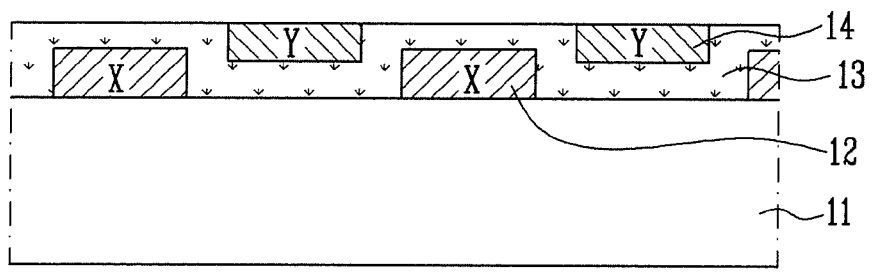

Thereafter, as shown in FIG. 5C, a transparent electrode material such as ITO is deposited on the first insulating film 13 and then is patterned, thereby forming second sensing patterns 14. Here, the second sensing patterns 14 are formed to have a suitable thickness smaller than the first sensing patterns 12, and are disposed not to be overlapped with the first sensing patterns 12 (however, the coupling parts of the first and second sensing patterns 12 and 14 may cross each other). In addition, the second sensing patterns 14 are patterned in order to be coupled to each other in a second direction (for example, in a row direction).

In addition, after the second sensing patterns 14 are formed, the metal patterns 15 and position detecting lines, etc., shown in FIGS. 2 and 3 are further formed using a suitable low resistance material having lower surface resistance than the transparent electrode material, such as a triple-layer of molybdenum/aluminum/molybdenum or a chrome film, etc.

Figure 5D:
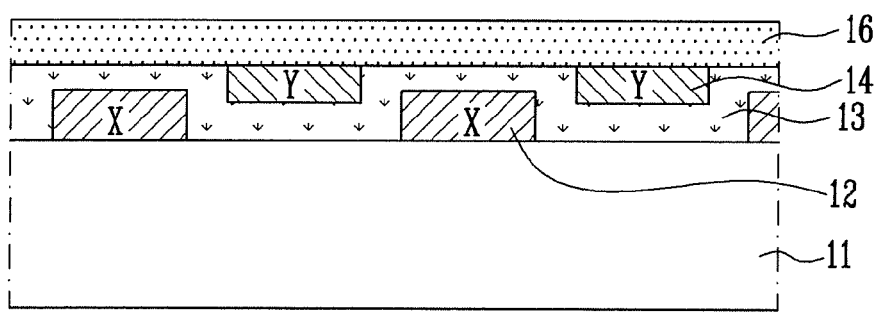

Thereafter, as shown in FIG. 5D, a second insulating material is printed and fired (or cured) on the second sensing patterns 14 and the metal patterns 15 in FIGS. 2 to 3 by utilizing a suitable printing method, thereby forming the second insulating film 16. In addition, the method of forming the second insulating film 16 is not limited only to the printing method, but the second insulating film 16 may be formed by utilizing a CVD method and/or a sputtering method.

Figure 5E:
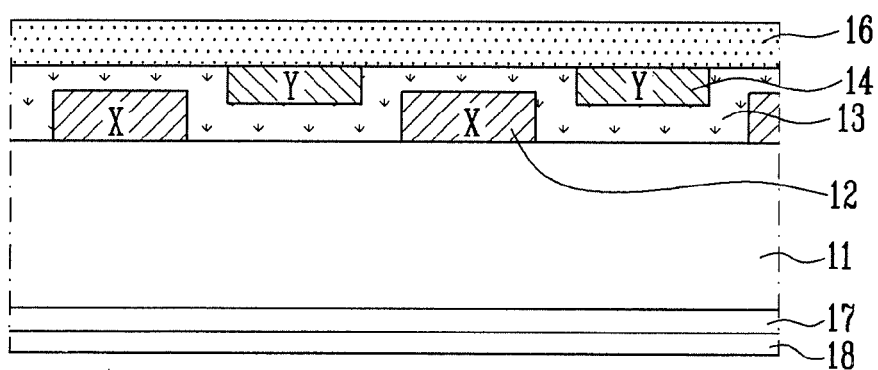

Thereafter, as shown in FIG. 5E, a transparent ground electrode 17 is deposited over the bottom surface of the transparent substrate 11, and furthermore, a third insulating film 18 is formed by utilizing the suitable printing method, the CVD method and/or the sputtering method, etc., in order to cover the transparent ground electrode 17.

With the foregoing method of fabricating the touch screen panel of the present invention, the masking process is reduced or minimized and the fabrication process step is simplified, making it feasible to enhance process efficiency.

FIG. 6 is a table showing reflectance measured according to the thicknesses of the first and second sensing patterns and the transparent ground electrode of FIG. 4. For the convenience of explanation, FIG. 6 shows the reflectances according to the thicknesses of the first and second sensing patterns and the transparent ground electrode measured through an optical simulation in a state where all the thicknesses of the first to third insulating films are set to 450 Å.

Hereinafter, the change of difference in reflectance according to the change of thicknesses of the first and second sensing patterns (X and Y sensing patterns) based on the state where the thickness of the transparent ground electrode is set to 220 Å will be described. To this end, the table of FIG. 6 describes in more detail for the case where the thickness of the transparent ground electrode is 220 Å.

Referring to FIG. 6, when the thicknesses of the first sensing patterns 12 (X sensing patterns) and the second sensing patterns 14 (Y sensing patterns) are set to 180 Å, the difference in reflectance therebetween is shown as 13.609% (i.e., (9.600−8.450)/8.450).

In addition, when the thicknesses of the first sensing patterns 12 (X sensing patterns) and the second sensing patterns 14 (Y sensing patterns) are set to 220 Å and 180 Å, respectively, it can be derived that the difference in reflectance therebetween is lowered to 4.918% (i.e., (9.600−9.150)/9.150). Also, assuming that a window is also provided on the upper portion of the touch screen panel in this case, it can be determined that the difference in reflectance between the first and second sensing patterns (X and Y sensing patterns) is effectively reduced, being lowered to 0.8%.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a transparent substrate;
   a plurality of first sensing patterns on a first surface of the transparent substrate and coupled to each other along a first direction;
   a first insulating film on the first sensing patterns; and
   a plurality of second sensing patterns on the first insulating film and coupled to each other along a second direction crossing the first direction, the second sensing patterns being alternately arranged with the first sensing patterns to not overlap with the first sensing patterns,
   wherein the thickness of the first sensing patterns is different from that of the second sensing patterns.

2. The touch screen panel as claimed in claim 1, wherein the thickness of the first sensing patterns is greater than that of the second sensing patterns.

3. The touch screen panel as claimed in claim 1, wherein each of the first and second sensing patterns is composed of a transparent electrode material.

4. The touch screen panel as claimed in claim 1,
   wherein the first sensing patterns having the same X-coordinate are coupled to each other as a column unit and the second sensing patterns having the same Y-coordinate are coupled to each other as a row unit,
   the touch screen panel further comprising a plurality of metal patterns on an edge portion of a region where the first and second sensing patterns are formed to electrically couple the first and second sensing patterns by the row unit or by the column unit to position detecting lines.

5. The touch screen panel as claimed in claim 1, further comprising:
   a second insulating film on the second sensing patterns.

6. The touch screen panel as claimed in claim 1, further comprising:
   a transparent ground electrode on a second surface of the transparent substrate opposite to the first surface of the transparent substrate.

7. A method of fabricating a touch screen panel, the method comprising:
   forming a plurality of first sensing patterns to be coupled to each other along a first direction on a first surface of a transparent substrate;
   forming a first insulating film on the first sensing patterns; and
   forming a plurality of second sensing patterns to be coupled to each other along a second direction crossing the first direction, the second sensing patterns being disposed alternately with the first sensing patterns to not overlap with the first sensing patterns on the first insulating film,
   wherein the thickness of the first sensing patterns is different from that of the second sensing patterns.

8. The method of fabricating the touch screen panel as claimed in claim 7, wherein the first and second sensing patterns are formed as coupled to each other along the first direction or the second direction while being patterned.

9. The method of fabricating the touch screen panel as claimed in claim 7, further comprising:

forming a second insulating film on the second sensing patterns.

10. The method of fabricating the touch screen panel as claimed in claim 7, further comprising;

forming a transparent ground electrode on a second surface of the transparent substrate opposite to the first surface of the transparent substrate.

\* \* \* \* \*